US009075568B1

(12) United States Patent
Gray

(10) Patent No.: US 9,075,568 B1
(45) Date of Patent: Jul. 7, 2015

(54) DYNAMIC DEVICE SKINS

(75) Inventor: Timothy T. Gray, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 133 days.

(21) Appl. No.: 13/425,752

(22) Filed: Mar. 21, 2012

(51) Int. Cl.
*G06F 1/16* (2006.01)
*G06F 3/0488* (2013.01)

(52) U.S. Cl.
CPC ............ *G06F 1/1626* (2013.01); *G06F 3/0488* (2013.01)

(58) Field of Classification Search
CPC . H04M 1/0202; H04M 1/22; H04M 1/72519; G06F 1/1626; G06F 3/1423; G06G 3/3648; G06G 3/0488; G09G 5/02; G09G 2300/0842; G02F 1/167
USPC ..................... 345/156–173, 76, 87, 107, 581, 345/588–589, 594, 690, 1.1; 715/744, 747, 715/762, 763, 771, 825, 761, 861, 866; 455/566, 575.1; 362/561; 340/815.49–815.56; 200/310–317
See application file for complete search history.

(56) References Cited

U.S. PATENT DOCUMENTS

| | | | |
|---|---|---|---|
| 6,608,996 B1* | 8/2003 | Laurikka et al. ............. | 455/90.3 |
| 2007/0152957 A1* | 7/2007 | Shibata ......................... | 345/156 |
| 2008/0094366 A1* | 4/2008 | Kwak et al. ................... | 345/170 |
| 2009/0215498 A1* | 8/2009 | Causey et al. ................ | 455/566 |
| 2010/0216514 A1* | 8/2010 | Smoyer et al. ............... | 455/566 |
| 2010/0257469 A1* | 10/2010 | Kim et al. ..................... | 715/763 |
| 2011/0141083 A1* | 6/2011 | Lu et al. ........................ | 345/211 |
| 2011/0191710 A1* | 8/2011 | Jang et al. ..................... | 715/776 |
| 2012/0096373 A1* | 4/2012 | Aguera y Arcas et al. ... | 715/764 |
| 2012/0218191 A1* | 8/2012 | Huang et al. .................. | 345/173 |
| 2013/0222208 A1* | 8/2013 | Gorilovsky et al. .......... | 345/1.1 |

* cited by examiner

*Primary Examiner* — Hong Zhou
(74) *Attorney, Agent, or Firm* — Novak Druce Connolly Bove + Quigg LLP

(57) ABSTRACT

Themes or other groups of content or settings can be applied to change various aspects of a computing device. In addition to changing aspects of a user interface, additional display elements, lights, and other components can be updated as well to give the appearance of customizable hardware. For example, display elements on the back and/or sides of a device can be updated with colors, graphics, or animations that enable the device to appear as if it has a new skin or casing. The user can customize, create, and/or share these themes, and the themes can be configured to automatically rotate or change over time.

24 Claims, 5 Drawing Sheets

DYNAMIC DEVICE SKINS

BACKGROUND

People are utilizing electronic devices, particularly portable electronic devices, for an increasing number and variety of tasks. It is not uncommon for a user to have a personal media player, notebook computer, cell phone, and electronic book reader, among other such devices. When attempting to have a user's device stand out among other devices, the options are limited. A user can buy a protective case with a specific color or design, but the cost can prevent frequent changing of the appearance. Further, the selection of case designs can be somewhat limited for certain devices. A user can alternatively place stickers or other objects on the exterior of the device, but users often are hesitant to place such objects on certain devices. Further, the objects can leave debris and other remnants that will generally not be aesthetically appealing.

BRIEF DESCRIPTION OF THE DRAWINGS

Various embodiments in accordance with the present disclosure will be described with reference to the drawings, in which.

DETAILED DESCRIPTION

Figure 1:
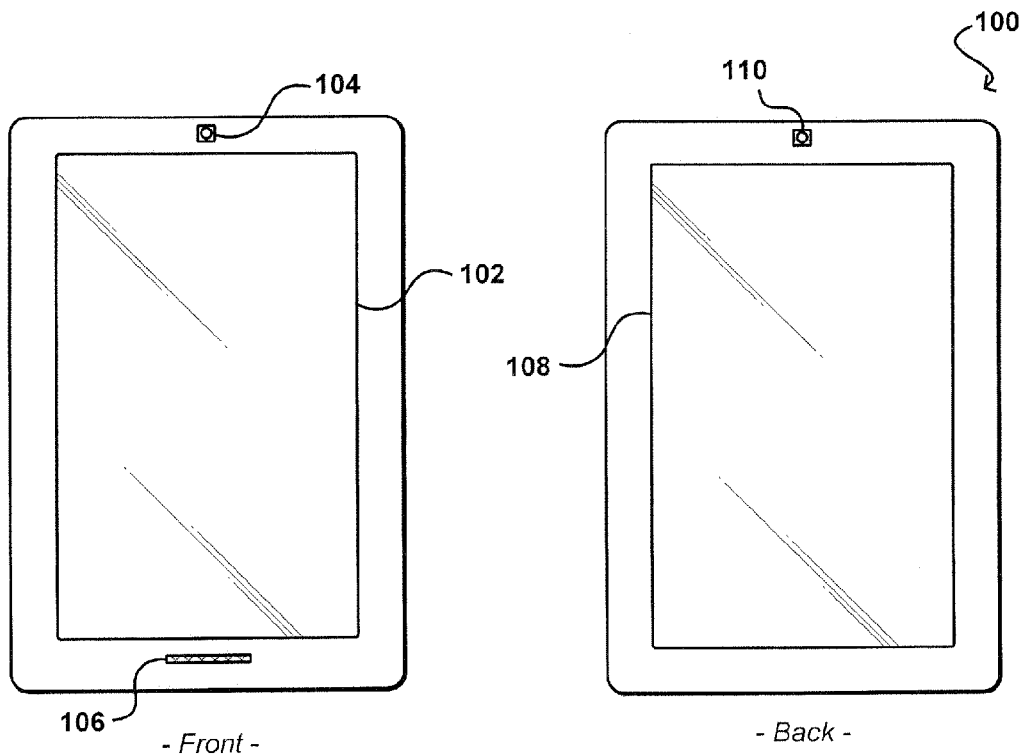
FIG. 1 illustrates front and back views of an example computing device that can be used in accordance with various embodiments.

Systems and methods in accordance with various embodiments of the present disclosure overcome one or more of the aforementioned and other deficiencies in conventional approaches to adjusting an appearance of an electronic device. In particular, various embodiments provide at least two different display elements, regions, or portions that can have differing display characteristics, enabling content to be selectively displayed on those elements, portions, or regions. Such regions can be used to update an external appearance of the respective device, such that the device can appear to have customizable hardware that can be managed through software. Further, one or more of these display elements can provide touch sensitivity such that a user can provide input via contact with one or more of the display elements, enabling additional types of interaction.

In various embodiments, a computing device includes a relatively dynamic display element, such as a liquid crystal display (LCD) or organic light emitting diode (OLED) display screen, and a relatively static display element, such as an electronic paper display (EPD) or electronic ink (e-ink) screen. An example device might have a dynamic display element on one side and a static display element on the other side. In other embodiments, a device might include two or more display elements of either type on different regions of the device. A relatively dynamic display element can have a significantly higher refresh rate in at least some embodiments, as well as other differing capabilities, that enable the dynamic display to provide content such as high resolution video. The relatively static element, on the other hand, might have a much lower refresh rate (e.g., on the order of a couple Hertz) that may be more appropriate for displaying content that does not change as often, such as a graphic, static image, or color selection. Because a static display can offer much lower power consumption, the device can advantageously display certain types of content using the static display.

In at least some embodiments, a user can select a theme, category, style, or other grouping of content and/or configuration settings for use with a computing device. While themes and other such groupings are known for user interfaces, such as to change the color of interface panels and buttons, or to display images on a desktop wallpaper or home screen, for example, approaches in accordance with various embodiments enable the user to also apply a theme to other portions, regions, or components of a device as well. For example, a device with an e-ink screen on the back can have an image displayed on the e-ink display (i.e., when not in active use) that corresponds to a selected theme. If there are e-ink display elements on the sides and back of the device, for example, the device can display a color or image that can appear to wrap all the way around the device, or at least a signification portion of the device, such that the device can appear to have a skin that the user can change. If dynamic elements are positioned about the device, the user can cause animations or other displays to be presented on the top, bottom, back, sides, corners, and/or other regions of the device, in addition to any changes to the main display and primary user interface region itself.

Various other applications, processes and uses are presented below with respect to the various embodiments.

FIG. 1 illustrates front and back views, respectively, of an example computing device 100 that can be used in accordance with various embodiments. Although a portable computing device (e.g., an electronic book reader, smart phone, or tablet computer) is shown, it should be understood that any electronic device capable of receiving and processing input, or at least capable of displaying information, can be used in accordance with various embodiments discussed herein, where the devices can include, for example, desktop computers, notebook computers, personal data assistants, video gaming consoles, television set top boxes, smart televisions, and portable media players, among others. In this example, the computing device 100 has a first display screen 102 on what will be referred to herein as the "front" side, although for certain devices or applications this side might act as a "back" side. The terms "front" and "back" may not infer a direction at all, but can refer merely to opposing sides of the device. In this example, the first display screen 102 will display information, under normal operation, to a user facing the first display screen (e.g., on the same side of the computing device as the first display screen). The first display screen in this example can be any appropriate element capable of displaying information such as video content, as may include a high color, high refresh liquid crystal display (LCD) or other such element. In this example, the first display element 102 is a touch screen, enabling a user to provide input by applying pressure to, or at least coming into contact with, at least one position of the first display screen. Many touch screens are known in the art that can be used with such a display in accordance with some embodiments, such that they will not be described in detail herein.

The user device 100 in this example also has a second display screen 108 on what will be referred to herein as the "back" side, although as discussed herein such designation can be for convenience and does not imply a directionality or relative importance of the first and second display elements unless otherwise stated. The second display screen 108 can display information, under normal operation, away from a user facing the first display screen (e.g., on the opposite side of the computing device as the second display screen). The second display screen in this example can be any appropriate element capable of displaying information with substantially lower power requirements, such as may result from a lower refresh rate, lower color, lower resolution, or different display type. In this example, the second display screen 108 is an electrophoretic display (EPD) element such as may be utilized in an electronic book reader where the displayed content (e.g., pages of a book) is not updated frequently. As known in the art, such elements typically require power only when changing the display state, such that the power consumption can be much lower than that of the first display element 102.

The first and second display elements in at least some embodiments can include a liquid crystal display, an electrophoretic display, electronic paper display, E-Ink display, a digital micromirror display (DMD), an Organic Light Emitting Diode (OLED) display, or any other display with pixels under a touch sensitive element. The first and second displays could be the same display type or any combination thereof. In some instances, the entire portable computing device could have a display characteristic. For example, the first or primary screen could be an LCD screen in a rectangle shape and the rest of the device could include an electrophoretic or E-Ink display. Electronic paper displays (EPDs), which are often used on electronic book (eBook) readers and other types of portable electronic devices, produce an image that can readily be viewed using reflected ambient light. The EPDs use much less electrical power than displays that emit light, such as liquid crystal displays (LCDs), because power is applied to initially produce an image, and the image thus rendered is stable and is retained on the display without the need for refreshing it. Examples of the types of EPDs currently in use include electrophoretic, electrowetting, electrofluidic, and interferometric modulator displays, to name a few. Because EPDs are not backlit, they are readily viewed in very bright ambient light, such as direct sunlight. However, when viewed with lower levels of ambient light, as may be the case indoors, the resulting image can appear to be lacking in brightness. A reflective display can use ambient or general lighting such as a front light to present the image to the user. Reflective displays include electrophoretic displays (EPDs), interferometric modulator displays (IMODs), cholesteric displays, electrowetting displays, and so forth. Various other types of display element can be used as well within the scope of the various embodiments.

Further, the second display element can also be touch sensitive. For example, the second display element can include a transparent e-ink element overlaying a touch sensitive element, such as an Interpolating Force-Sensitive Resistance (IFSR) element. Unlike conventional capacitive sensors, an IFSR element can detect any object contacting the element, as well as the amount of pressure being applied to every point on the touch element by that object or any other object. In some embodiments, the second display element can allow for both capacitive and resistive touch inputs. The second display element can be multi-color, two color (e.g., black and white), or grayscale, and can be at a lesser, similar, or greater resolution than the first display element. The second display screen also can have a lower, similar, or greater refresh rate than the first display screen, although in many embodiments the second display screen will be an electronic ink display with a lower refresh rate and lower power consumption, while the first display element will be a full color display with a higher refresh rate capable of displaying video content. In at least some embodiments, such as an electronic book reader, the second display element might function as the primary display, while in other embodiments, such as for a tablet computer, the first display screen might function as the primary display. Various other options exist as well as discussed elsewhere herein. Also, IFSR can be used with the primary display screen or other portions of the device, as discussed elsewhere herein.

The example computing device 100 can have a number of other input mechanisms, such as at least one front image capture element 104 and at least one back image capture element 110 positioned on the device such that, with sufficient lenses and/or optics, the user device 100 is able to capture image information in substantially any direction about the computing device. The example user device 100 also can include at least one microphone 106 or other audio capture device capable of capturing audio data, such as words spoken by a user of the device.

Figure 2:
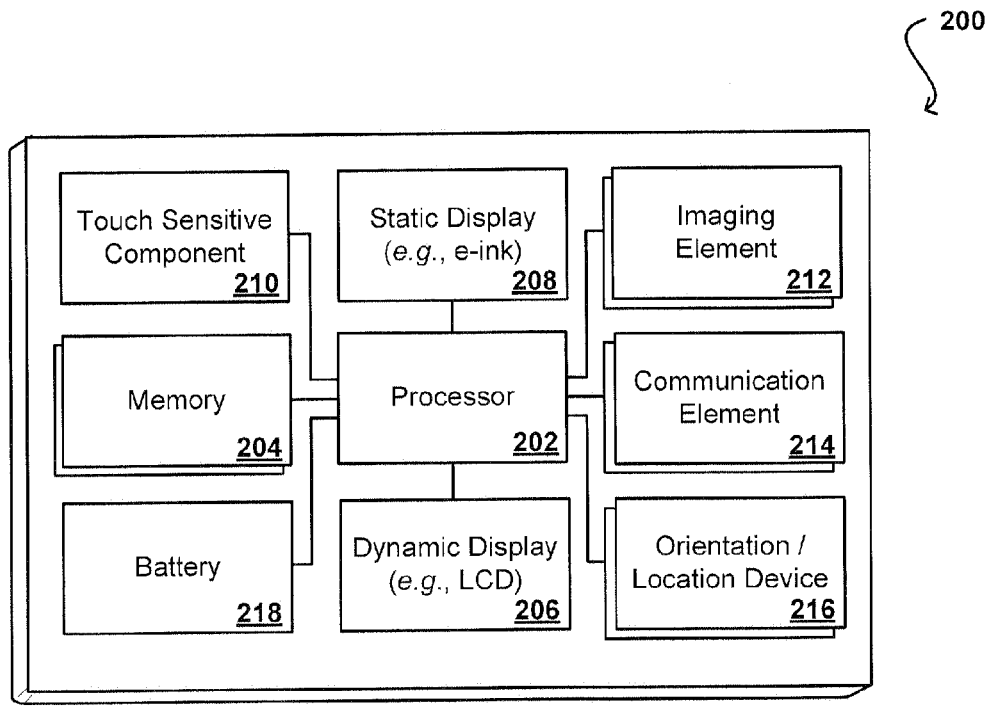
FIG. 2 illustrates example components that can be used with a computing device such as that illustrated in FIG. 1.

FIG. 2 illustrates a logical arrangement of a set of general components of an example computing device 200 such as the user device 100 described with respect to FIG. 1. In this example, the device includes at least one processor 202 for executing instructions that can be stored in a memory device or element 204. As would be apparent to one of ordinary skill in the art, the device can include many types of memory, data storage, or non-transitory computer-readable storage media, such as a first data storage for program instructions for execution by the processor 202, a separate storage for images or data, a removable memory for sharing information with other devices, etc. The device in this example includes at least one first display element, referred to herein as a "dynamic" display element 206 and at least one second display element, referred to herein as a "static" display element 208. The terms "static" and "dynamic" are not meant to be interpreted literally, but refer generally to the relative types of content and/or usage that may be appropriate for each type of display. For example, a relatively "dynamic" display element, such as an LCD screen, might be capable of displaying video content or substantially real-time interactive content with acceptable performance characteristics, while a relatively "static" display element, such as an electronic paper display, might be better suited to display content that does not change as often, such as a map or a current page of an electronic book. It should be understood that the content of a static display screen will change over time, and that content might remain unchanged on a dynamic display screen for at least a period of time. Further, in at least some embodiments it will be possible that each of the first and second display screens is able to display similar types of content with similar capabilities, such that one is not necessarily more static or dynamic than the other.

Each of the first and second display screens in this example device 200 can be at least partially touch sensitive, as may require one or more touch sensitive components 210 that may be part of, or separate from, the display elements. The touch sensitive components can provide touch input through resistive, capacitive, or other such mechanisms as known for such purposes. In at least some embodiments, at least a portion of the casing or surfaces other than the display elements can also be touch sensitive. For example, an outer edge or frame of the device might be at least partially able to receive touch input. An IFSR or similar material can be placed about the device such that any appropriate surface or portion can provide for input through contact. In at least some embodiments, at least one touch sensitive path will exist between the first and second display screens on opposite sides of the device.

As discussed, the device in many embodiments will include at least one image capture element 212 such as a camera or infrared sensor that is able to image objects in the vicinity of the device. It should be understood that image capture can be performed using a single image, multiple images, periodic imaging, continuous image capturing, image streaming, etc. The device also can include one or more orientation and/or location determining elements 216, such as an accelerometer, gyroscope, electronic compass, or GPS device as discussed above. These elements can be in communication with the processor in order to provide the processor with positioning and/or orientation data. The device can also include communication elements 214 enabling network communications such as Internet connections, cellular connections, and the like.

In some embodiments, the computing device 200 of FIG. 2 can include one or more sideband or other such communication elements (not shown), such as a Wi-Fi, Bluetooth, RF, or another wireless communication system, enabling the user device to communicate with other devices or components, such as a charger or docking station. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The example device 200 also includes a battery 218 or other appropriate power source. The power source can include, for example, at least one rechargeable battery, and can include other elements as well such as solar power cells or other such elements.

Figure 3:
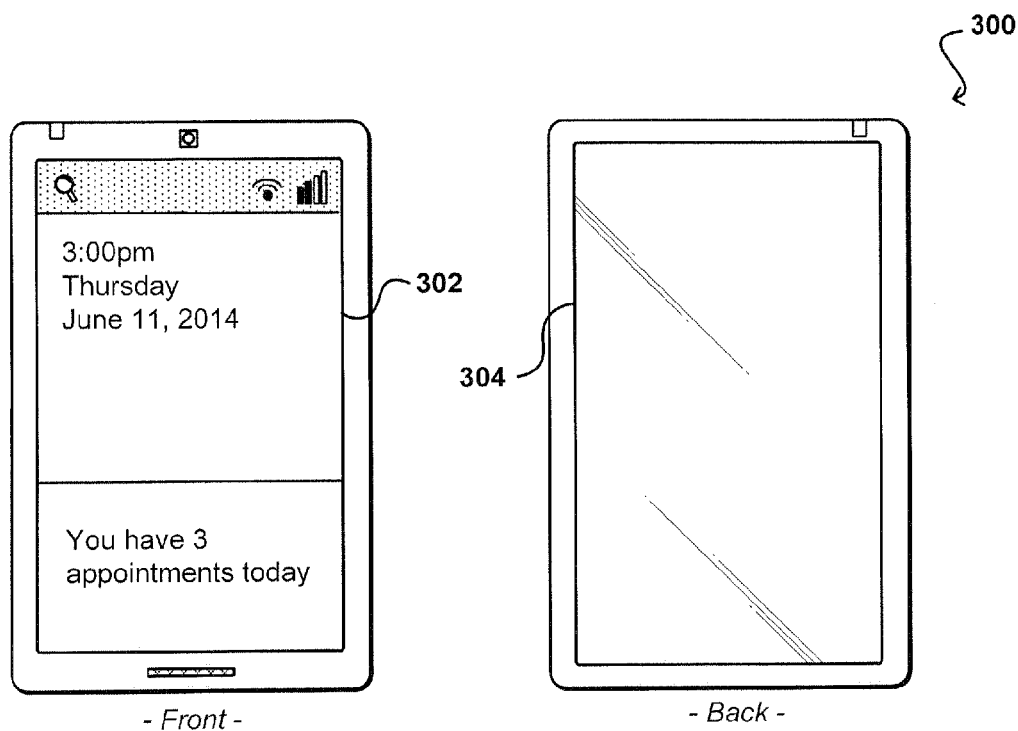
FIG. 3 illustrates front and back views of displays for an example electronic device that can be used in accordance with various embodiments.

FIG. 3 illustrates front and back views of an example computing device 300 that can be utilized in accordance with various embodiments. In this example, there is an LCD screen 302 on the front of the device and an e-ink display 304 (color or monochrome) on the back of the device. During conventional operation, an interface might display basic information through a user interface provided by an operating system of the device, for example. This can include data and time, information about the user's schedule, information about existing connections and available options, and other such content known for display to a user on such a device. Unless the user is actively reading an e-book or other relatively static content, the e-ink screen 304 might not display anything, or might remain in the state that was last displayed to the user. As known in the art, e-ink screens do not draw power when an image is displayed, only when the image is changed, such that an image can be left on the e-ink screen if desired. If the back screen is an LCD screen or other element that actively draws power, the device might be turned off or otherwise adjusted to conserver power, particularly for a mobile or wireless device.

As mentioned above, the operating system and/or applications executing on the device can enable the user to change various aspects of the user interface rendered on the primary display 302. This can include, for example, adjusting a color of various menus or options, adding a wallpaper image to the desktop or home screen, adding a screen saver, and the like. As known, a user can also download, select, or install various "themes" that include a combination of these settings, usually having a common thread or aspect such as a color palette, topic, person, place, type, etc. Using many conventional approaches, however, the user would be limited to customizing the image that is displayed on the primary display 402 and potentially sounds played by at least one speaker of the device (not shown).

Figure 4:
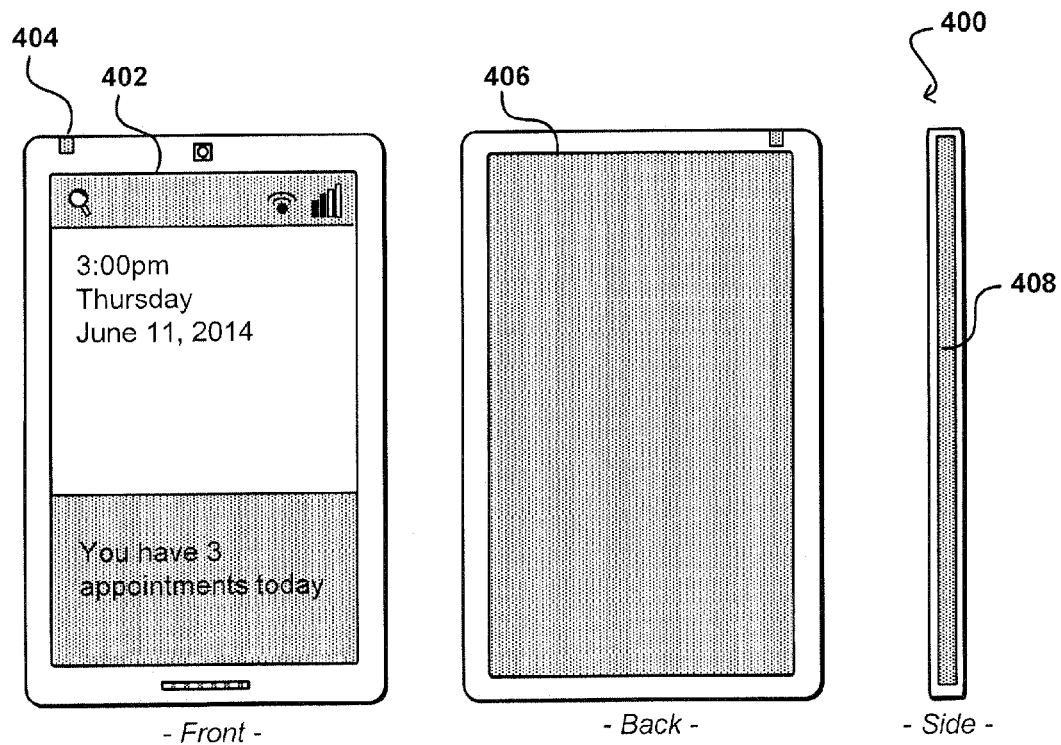
FIG. 4 illustrates front and back views of displays for an example electronic device that can be used in accordance with various embodiments.

Systems and methods in accordance with various embodiments, however, enable a user to also customize various other portions of the device as well. For example, FIG. 4 illustrates an example state 400 wherein a user has installed a theme on a computing device, in this case corresponding to the user's favorite color. As can be seen, various aspects of the user interface on a main display 402 are updated to include the color of the theme. As can also be seen, a multi-color LED 404 or other illumination element of the computing device can also have the color updated to correspond to the theme. Thus, if a user selects a purple theme it is possible that a reminder light on the device changes to a purple color as well.

Further, any other display element or portion on the device can be updated as well. For example, the device in FIG. 4 includes a secondary display element 406 on the back of the device. If the secondary display element is a color e-ink screen, for example, the screen can be switched to a color corresponding to the theme, and can continue to display this color until instructed to change the display state. Thus, a user can effectively change the color of the back of the device when the user is not otherwise using an element on the back of the device. Similarly, if the device has e-ink, LCD, OLED, or other display elements or portions on one or more sides of the device, those display elements 408 can display the color as well. In some embodiments, the theme can cause a set of related colors to rotate over time, or otherwise change with time of day, motion, activity, or other such information, or at random in various embodiments.

Figure 5:
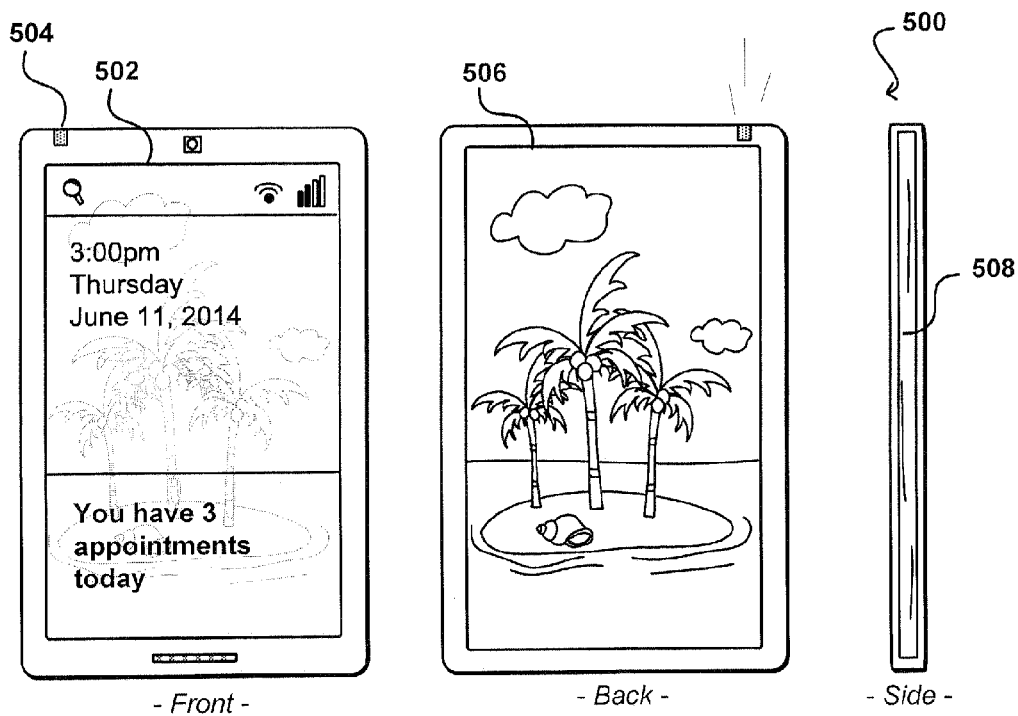
FIG. 5 illustrates front and back views of displays for an example electronic device that can be used in accordance with various embodiments.

It should be understood, however, that themes are not limited to colors but can also relate to certain topics that can include images, graphics, animations, movies, and the like. For example, FIG. 5 illustrates an example state 500 wherein a "beach" or "island" theme has been selected. The theme may have been pre-installed on the device, downloaded or purchased by the user, created by the user, or otherwise obtained. The theme also can be customizable in at least some embodiments, and can be shared with friends or connections of a social networking group, etc. In some embodiments, groups of friends or colleagues can share skins or themes to present a consistent appearance, etc. In this example an image of an island is displayed on the primary display screen 502, and could potentially be animated while the device is in use to show the palm trees swaying in the breeze, waves crashing on the beach, or other such content. A color of any lights 504 or other such elements can be updated as appropriate, such as to display an ocean blue or beach sand color. Further, a display screen 506 on the back or side 508 of the device can be updated to show a graphic or animation for the theme as well, as may depend at least in part upon the type of device. For example, if the back element is an e-ink display then a still image might be displayed. If the back element is a display with a relatively high refresh rate, for example, the device might show an animation or video when the device is in an active state but not show anything while the device is in a standby mode or powered down. Various other options are possible as well within the scope of the various embodiments.

As illustrated, if the device has display elements 508 on one or more sides as well, those sides can also display content for the theme. For example, if the side elements are e-ink elements then the side elements can display content such as images of sand, shells, or water. If the side elements are capable of showing animation, the sides can shown water crashing on the beach, palm fronds blowing in the breeze, or other such content. In at least some embodiments the displays on the back and sides can be coordinated to appear to show a continuous, or at least related, image or animation.

Figure 6:
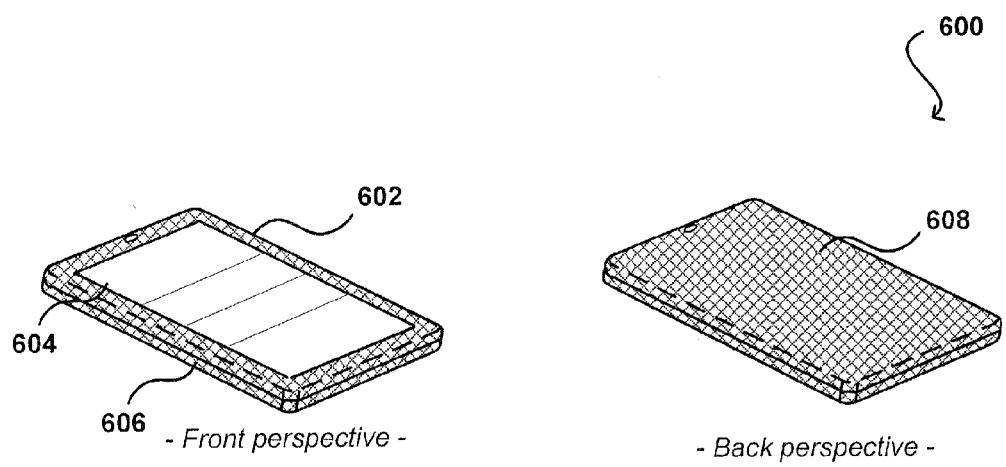
FIG. 6 illustrates front and back perspective views of displays for an example electronic device that can be used in accordance with various embodiments.

In some devices the display elements may not include distinct or disparate regions. For example, the state 600 illustrated in FIG. 6 illustrates a device having a substantially continuous display around an exterior of the device 602. For such a device, there can be a distinct primary image region 604 used as the primary user interface, or there can be a continuous display that can be segmented or utilized as appropriate, and in some cases the side facing up or "towards" the user at any given time, as may be determined using a camera of the device, might be the current "primary" display side. For such a device, any or all portions of the device can show a color, graphic, theme, or other such content. In this example, the portions of the device to the sides 606 and the back 608 are changed to show the selected color or graphics, in order to enable the device to appear as if the device has a customized casing that can be dynamically, automatically, or manually updated as appropriate. In some embodiments, user profile information can be stored on the device such that the theme and "skin" of the device changes to correspond to the preferences or settings of the current user.

In certain embodiments, a user can download applications that automatically update or rotate the content displayed, colors used, and other such information. In some embodiments, a theme might be obtained as additional content for a game, movie, book, or other such content. For example, if a user buys an e-book the user might be able to load a theme that causes the sides and back of the book to look as if the user is reading a physical copy of the book, showing the cover, spine, and pages of the book on the appropriate sides. If the user downloads a game, there can be graphics and animations that can be showed on the display elements, either at specified times or while the user is playing the game, for example. A user can also download an application that can work with the device and/or software on the device to make the device appear as if it is "see-through," such that the user can see the internal components of the device or see the "sides" and "back" of the interface through the phone, such as by displaying a mirror image of the interface on the back of the device. And all these apparent changes to the "hardware" of the device, such as the cover and lights, are updated through software in at least some embodiments. Various other options can be utilized as well as should be apparent to one of ordinary skill in the art in light of the teachings and suggestions contained herein.

Figure 7:
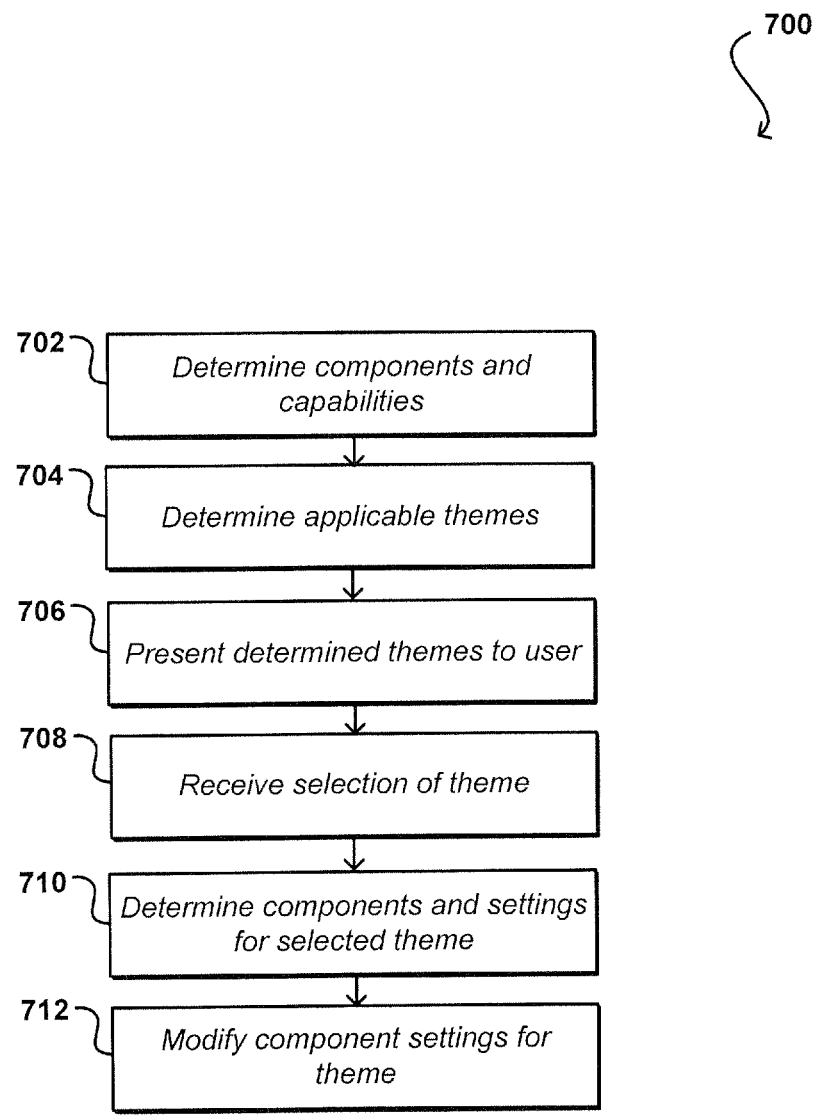
FIG. 7 illustrates an example process for placing and moving content between display elements of a device that can be used in accordance with various embodiments.

FIG. 7 illustrates an example process 700 for updating an appearance of a computing device that can be used in accordance with various embodiments. It should be understood for this and other processes discussed herein, however, that there can be additional, fewer, or alternative steps performed in similar or alternative orders, or in parallel, within the scope of the various embodiments unless otherwise stated. In this example, software executing on (or in communication with) the device determines 702 configuration information for the device, as may include the type and number of components on the device, as well as the capabilities of those components. For example, the software might attempt to determine the number of display elements on the device, as well as the type and location of each display, resolution and color depth, and other such information. The software can also attempt to determine 704 and/or select themes that are appropriate for the device configuration. For example, the software might not select a theme that includes only animation where the device only includes older, low-refresh e-ink screens. One or more themes can then be displayed or otherwise presented 706 to the user, such as when the user searches for themes, a new theme is available, etc. When a selection of one of the themes is received 708, the components that will be affected by the theme and the settings for those components determined 710, and those component settings are modified 712 per the selected theme. As discussed, this can include updating colors, sounds, skins, appearances, or other such aspects of any appropriate component of the device.

Figure 8:
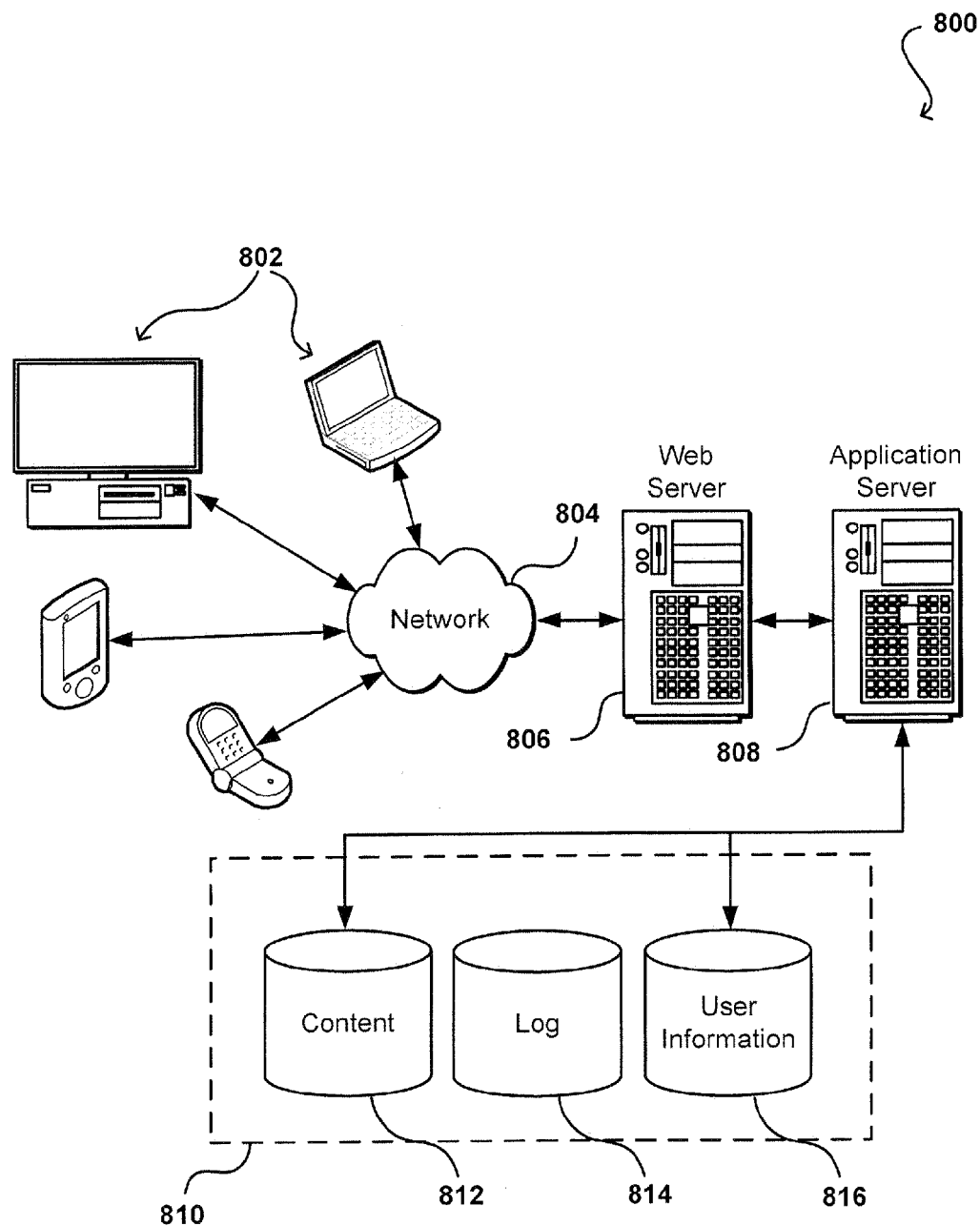
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network also can communicate with devices such as a charger (not shown), as discussed herein. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NPS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of updating an appearance of a computing device, comprising:
    receiving an instruction to activate a theme on the computing device, the theme including one or more images and specifying one or more colors;
    updating one or more elements of a user interface displayed on a first display element of the computing device to include at least a first image from the one or more images;
    causing at least one second image from the one or more images to be displayed on a second display element of the computing device, the first and second display elements having different refresh rates and being on opposite sides of the computing device, and the at least the first image being different than the at least one second image, the at least the first image being displayed at a different resolution than the at least one second image;
    causing at least one third image from the one or more images to be displayed on a side display element of the computing device, the side display element being an electrophoretic display on a side of the computing device different from the opposite sides of the computing device, the at least one third image being different than the at least the first image and the at least one second image; and
    updating a display color for a multi-color illumination element of the computing device, wherein the color corresponds to the theme.

2. The computer-implemented method of claim 1, wherein the first display element is a liquid crystal display (LCD) and the second display element is an electrophoretic display.

3. The computer-implemented method of claim 1, wherein the computing device is one of a tablet computer, a smart phone, a personal computer, a notebook computer, a smart television, a personal data assistant, and a portable gaming device.

4. The computer-implemented method of claim 1, wherein the first display element is on a front of the computing device and the second display element is on a back of the display element.

5. A computer-implemented method, comprising:
    under control of one or more computing systems configured with executable instructions,
    receiving a selection of a theme to be used on the computing device, the theme including appearance information including at least one of color information or image information;
    determining first capability information for a first display element, second capability information for a second display element and third capability information for a third display element on the computing device, the first display element and the second display element having different refresh rates and being positioned on opposite sides of the computing device, the third display element being positioned on a side of the computing device different from the opposite sides of the computing device;
    determining, based at least in part upon the determined first capability information, second capability information and third capability information, a first type of appearance information to be displayed on the first display element, a second type of appearance information to be displayed on the second display element and a third type of appearance information to be displayed on the third display element, the first type of appearance information being different than the second type of appearance information and the third type of appearance information;
    causing the first display element to display the first type of appearance information at a first resolution, the second display element to display the second type of appearance information at a second resolution, and the third display element to display the third type of appearance information, the first resolution being different from the second resolution; and
    updating a display color for a multi-color illumination element of the computing device, wherein the color corresponds to the appearance information of the theme.

6. The computer-implemented method of claim 5, wherein the at least two display elements includes at least one of a liquid crystal display (LCD), an organic light emitting diode display (OLED), a multi-color light emitting diode, an electrophoretic display.

7. The computer-implemented method of claim 5, wherein the at least two display elements includes at least one display element on a front of the computing device and at least one display element on a back of the computing device.

8. The computer-implemented method of claim 5, wherein the first display element is an LCD on a front of the computing device and the second display element is an electrophoretic display on a back of the computing device, the theme causing the at least one of color information or image information to be displayed on the electrophoretic screen while a user is using with an interface displayed on the LCD.

9. The computer-implemented method of claim 8, wherein an appearance of one or more elements in the interface displayed on the LCD screen is updated to include the at least one of color information or image information for the theme.

10. The computer-implemented method of claim 5, wherein the capability information includes at least one of a refresh rate, a type of display, a display size, a color depth, or a resolution.

11. The computer-implemented method of claim 5, wherein the theme corresponds to an electronic book (e-book), and wherein a display element on a front side of the computing device is configured to display a cover image of the book while a display element on a back side of the computing device is configured to display content of the e-book.

12. The computer-implemented method of claim 5, wherein the theme is configurable by the user.

13. The computer-implemented method of claim 5, wherein the theme includes information causing the computing device to change selections of at least one of the color information or the image information over time.

14. The computer-implemented method of claim 5, wherein the image information includes at least one of image content, video content, or animation content.

15. A computing device, comprising:
a processor;
a first display screen on a first side of the computing device;
a second display element on a second side of the computing device;
a third display element on a third side of the computing device;
a multi-color illumination element; and
memory including instructions that, when executed by the processor, cause the computing device to:
receive a theme to be installed on the computing device, the theme including one or more images and specifying one or more colors;
update one or more elements of a user interface displayed on the first display screen to include at least a first image from the one or more images;
cause at least one second image from the one or more images to be displayed on the second display element of the computing device at a different resolution than the first image, the first display screen and the second display element being associated with different refresh rates, and the at least the first image being different than the at least one second image;
cause at least on third image from the one or more images to be displayed on the third display element of the computing device, the at least one third image being different than the at least one first and second images; and
update a display color for the multi-color illumination element, wherein the color corresponds to the theme.

16. The computing device of claim 15, wherein the first display screen is a liquid crystal display (LCD) or an organic light emitting diode display (OLED), and wherein the second display element includes an electrophoretic display element.

17. The computing device of claim 15, wherein one or more third display elements is configured to display one of the images or specified colors in order to adjust an appearance of an exterior of the computing device.

18. The computing device of claim 17, wherein the appearance of the exterior of the computing device remains even when the computing device is not in an active state.

19. The computing device of claim 15, wherein the images include at least one of image, video, or animation content.

20. A non-transitory computer-readable storage medium including instructions that, when executed by a processor of a computing device, cause the computing device to:
receive a selection of a theme for the computing device, the theme including appearance information including at least one of color information or image information;
determine first capability information for a first display element, second capability information for a second display element of the computing device and third capability information for a third display element of the computing device, the first and second display elements having different refresh rates and being positioned on opposite sides of the computing device, the third display element being positioned on a side of the computing device different than the opposite sides of the computing device;
determine a first type of appearance information to be displayed on the first display element, a second type of appearance information to be displayed on the second display element and a third type of appearance information to be displayed on the third display element based at least in part upon the determined first capability information, second capability information and third capability information, the first type of appearance information being different than the second type of appearance information and the third type of appearance information;
cause the first display element to display the first type of appearance information at a first resolution, the second display element to display the second type of appearance information at a second resolution, and the third display element to display the third type of appearance information, the first resolution being different from the second resolution; and
update a display color for a multi-color illumination element of the computing device, wherein the color corresponds to the one or more colors specified by the theme.

21. The non-transitory computer-readable storage medium of claim 20, wherein the first display element includes an LCD on a front of the computing device and the second display element includes an electrophoretic display on a back of the device, the theme causing the at least one of color information or image information to be displayed on the electrophoretic display while the user is using an interface displayed on the LCD.

22. The non-transitory computer-readable storage medium of claim 21, wherein an appearance of one or more elements in the interface displayed on the LCD is adjusted corresponding to the at least one of the color information or the image information for the theme.

23. The non-transitory computer-readable storage medium of claim 20, wherein the capability information includes at least one of a refresh rate, a type of display, a display size, a color depth, or a resolution.

24. The non-transitory computer-readable storage medium of claim 20, wherein the theme corresponds to an electronic book (e-book), and wherein a display element on a front side of the computing device is configured to display a cover image of the book while a display element on opposite back side of the computing device is configured to display content of the e-book.

* * * * *